July 7, 1959  H. A. BARBER ET AL  2,893,601
SYSTEM AND APPARATUS FOR MEASURING BITUMEN AND THE LIKE
Filed Sept. 9, 1955  5 Sheets-Sheet 1

INVENTORS
HARRY A. BARBER
JAMES F. SAUER
BY
ATTORNEYS

INVENTORS
HARRY A. BARBER
JAMES F. SAUER
BY
ATTORNEYS

July 7, 1959 H. A. BARBER ET AL 2,893,601
SYSTEM AND APPARATUS FOR MEASURING BITUMEN AND THE LIKE
Filed Sept. 9, 1955 5 Sheets-Sheet 3
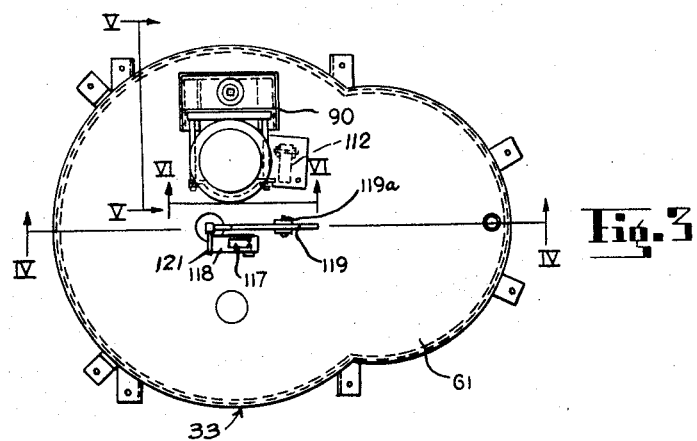
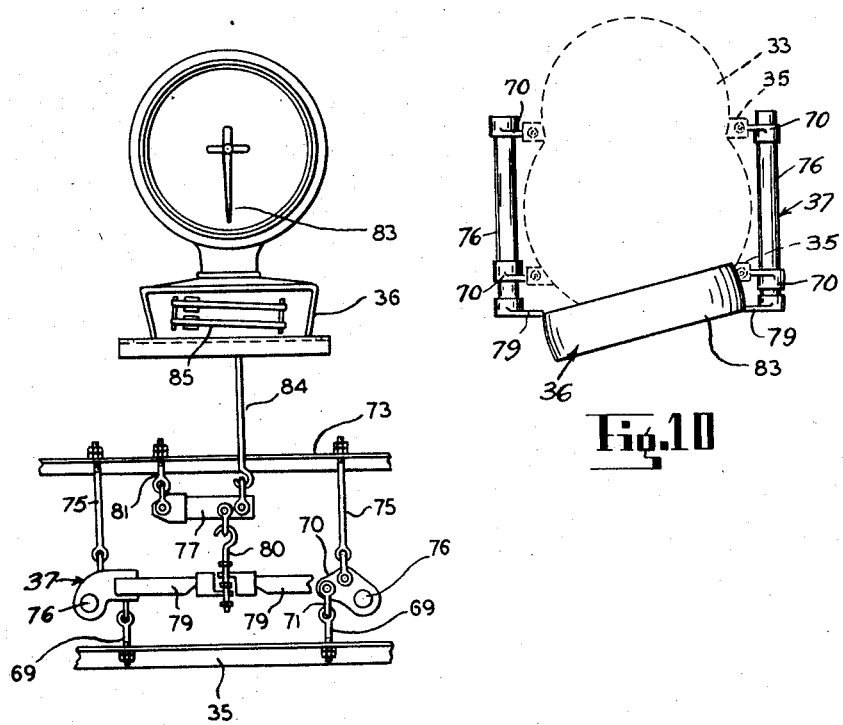
INVENTORS
HARRY A. BARBER
JAMES F. SAUER
BY
ATTORNEYS July 7, 1959 H. A. BARBER ET AL 2,893,601
SYSTEM AND APPARATUS FOR MEASURING BITUMEN AND THE LIKE
Filed Sept. 9, 1955 5 Sheets-Sheet 4

INVENTORS
HARRY A. BARBER
JAMES F. SAUER
BY
ATTORNEYS

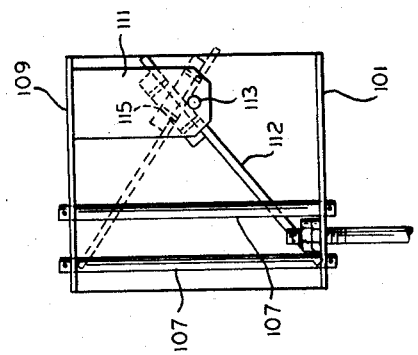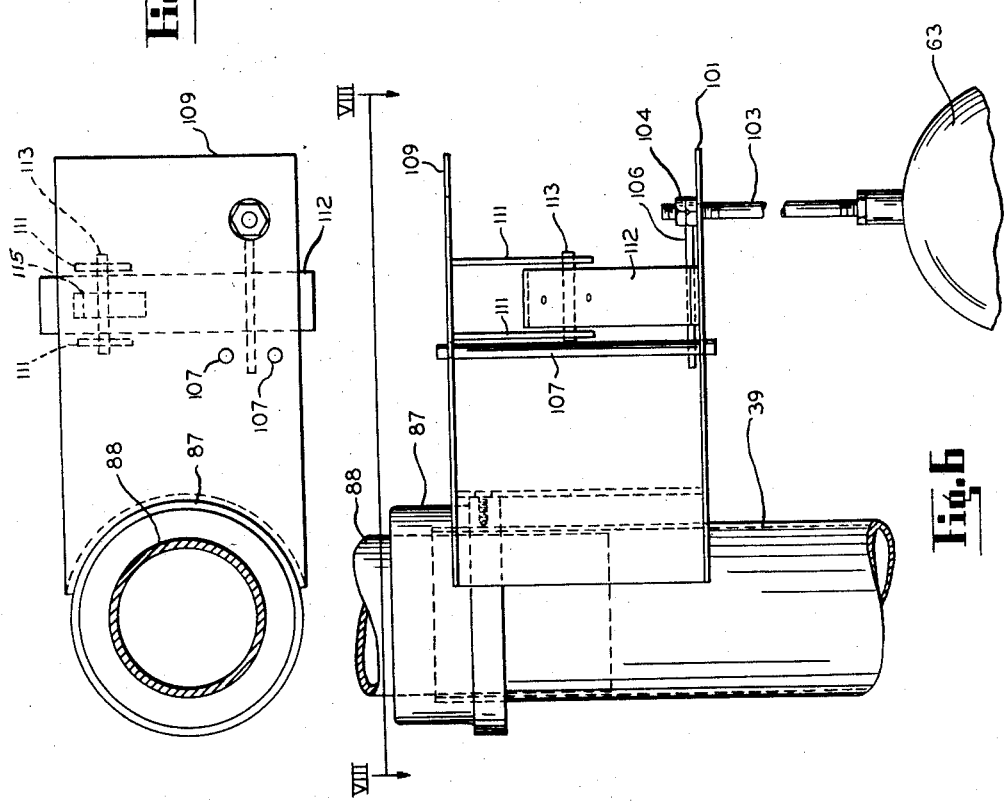

United States Patent Office 2,893,601
Patented July 7, 1959

2,893,601
SYSTEM AND APPARATUS FOR MEASURING BITUMEN AND THE LIKE

Harry A. Barber and James F. Sauer, Aurora, Ill., assignors to Barber-Greene Company, Aurora, Ill., a corporation of Illinois Application September 9, 1955, Serial No. 533,471

11 Claims. (Cl. 222—1)

This invention relates to a system and apparatus for measuring bitumen and the like, and more particularly relates to such an apparatus and system for charging a pugmill of a batch asphalt plant with bitumen for mixture with aggregate and mineral fines.

A principal object of the invention is to provide a novel and improved system and apparatus for measuring bitumen such as asphalt and the like and charging a pugmill therewith.

Another object of the invention is to provide a novel and improved system and apparatus for measuring asphalt for batch mixture with aggregate.

A further object of the invention is to provide a simplified form of apparatus and system for measuring fluid materials such as asphalt by filling a weigh bucket to an overflow, withdrawing asphalt by suction and during the withdrawing operation weighing the asphalt withdrawn and adjusting the suction means to withdraw a measured volume of asphalt in accordance with the weight initially withdrawn.

A further object of the invention is to provide a simplified and novel form of charging and measuring system and apparatus for asphalt and the like in which a predetermined weight of asphalt is withdrawn from a weigh bucket by means of a suction tube and the suction tube is adjustable to withdraw no more asphalt than a predetermined weight of asphalt initially withdrawn.

Still another object of the invention is to provide a circulating system and measuring and spraying means for asphalt and the like for spraying mixed aggregate with asphalt in a pugmill in which a weigh bucket is filled to overflowing under the control of valve means operated in accordance with the level of asphalt in the weigh bucket, and an adjustable suction tube is provided to withdraw asphalt from the weigh bucket to a predetermined depth of asphalt in the weigh bucket in accordance with a required weight of asphalt for mixture with a batch of aggregate.

These and other objects of the invention will appear from time to time as the following specification proceeds and with reference to the accompanying drawings wherein:

Figure 3 is a plan view of the weigh bucket and casing therefor with certain of the fluid connections broken away;

Figure 6 is a fragmentary sectional view taken substantially along line VI—VI of Figure 3;

Figure 7 is a fragmentary detail view looking toward the suction tube and switch arm shown in Figure 6 in order to illustrate certain details thereof not shown in Figure 6;

Figure 8 is a horizontal sectional view taken substantially along line VIII—VIII of Figure 6;

Figure 9 is a view illustrating the support for the weigh bucket on a scale for weighing; and Figure 10 is a plan view looking downwardly on the scale and showing the weigh bucket in dotted.

Figure 1:
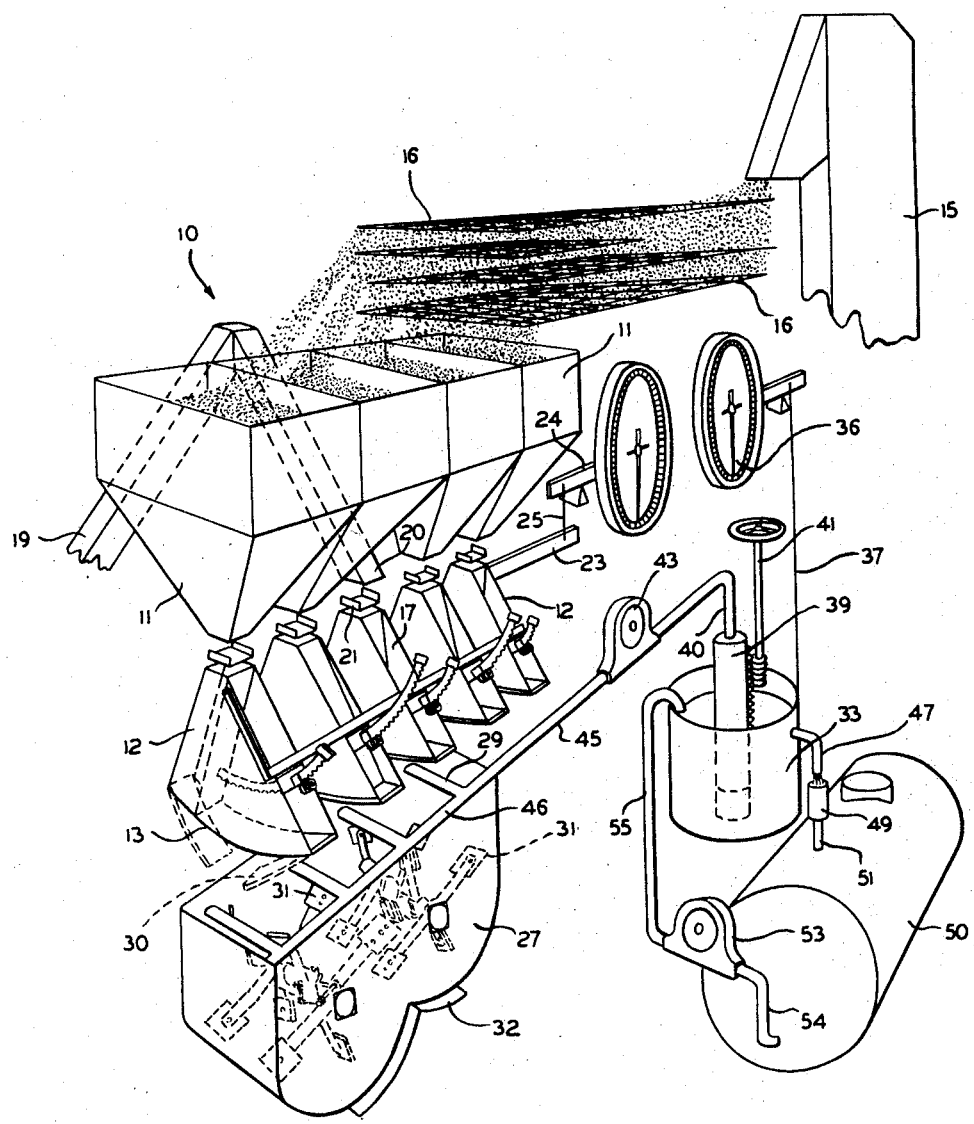
Figure 1 is a diagrammatic view of an asphalt batch plant having an asphalt charging and measuring means constructed in accordance with the invention embodied therein.

In the embodiment of our invention illustrated in the drawings, we have diagrammatically shown in Figure 1, a bituminous batch plant 10, including generally a plurality of storage bins 11 for aggregate, arranged to discharge aggregate into aligned aggregate measuring bins 12 carried in a drop bottom weigh hopper 13, as shown and described in our joint application with Roy C. Heacock, Serial No. 533,284, filed herewith.

Dried aggregate may be supplied to the storage bins 11 directly from an aggregate drier (not shown) by means of an elevator 15, which may be a bucket elevator of a well known form. The elevator 15 may elevate and discharge the dried aggregate directly onto sizing screens 16, one sizing screen being provided for each storage bin 11 to supply the properly sized aggregate thereto.

The weigh hopper 13 also contains a bin 17 for mineral fines, herein shown as being positioned between two intermediate aggregate bins 12 and receiving mineral fines supplied by an elevator 19, discharging into a supply or storage chute 20 in direct communication with the bin 17 through a sliding gate 21.

The weigh hopper 13 is supported on spaced beams 23 connected with a scale lever 24 through a linkage and lever arrangement 25 for indicating the weight of aggregate and mineral fines contained in the weigh hopper 13 for discharge into a pugmill 27, where the aggregate and mineral fines are mixed and asphalt is sprayed thereon by means of spray bars or pipes extending transversely of said pugmill and spaced therealong.

The weigh hopper 13 is provided with a clam shell discharge gate 30 for simultaneously discharging aggregate from all of the bins in said weigh hopper into the pugmill 27.

The pugmill 27 is shown as having a plurality of spaced paddles 31 therein, power driven to rotate toward each other along the bottom of the pugmill, and as having a discharge gate 32 slidable to discharge the mixed aggregate, mineral fines and asphalt into a truck or the like (not shown). The pugmill 27 is no part of our present invention so need not herein be shown or described further.

Asphalt is measured in a receptacle in the form of a weigh bucket or tank 33 supported on parallel spaced beams 35 having connection with a scale 36 through a linkage and leverage arrangement 37 which will hereinafter be more fully described as this specification proceeds. The weigh bucket 33 is shown as having a suction pipe 39 extending therein and adjustable to withdraw a predetermined weight of asphalt therefrom as will hereinafter more clearly appear as this specification proceeds. The adjustable suction pipe 39 is connected with a supply pipe 40 having a valve 41 therein, which may be power operated under manual or automatic control to supply hot asphalt to a spray pump 43, when the valve 41 is open. The valve 41 is vented to the atmosphere when closed, through an air vent 44. A pipe 45 is connected with the discharge side of the spray pump 43 and has connection with the spray bars or pipes 29 through a header 46 extending along the pugmill 27.

The weigh bucket 33 has an overflow duct 47 leading therefrom adjacent the upper end thereof for conducting asphalt overflowing said weigh bucket into a vertical duct 49 connected with a storage tank 50 through a pipe 51.

Asphalt is supplied to the weigh bucket 33 from the storage tank 50 by means of a circulating pump 53 having connection with the storage tank 50 through a suction pipe 54. The pressure side of the circulating pump 53 has a pressure pipe 55 connected therewith having connection with a three-way valve 56. The valve 56 may operate under manual or automatic control and controls the flow of asphalt to the weigh bucket 33 through a pressure pipe 57 leading within the weigh bucket 33 to a position adjacent the bottom thereof. The valve 56 may also be positioned to by-pass asphalt back to the tank 50 through a by-pass line 59, when the weigh bucket 33 is full. A drain 58 leads from the bottom of said weigh bucket.

Figure 4:
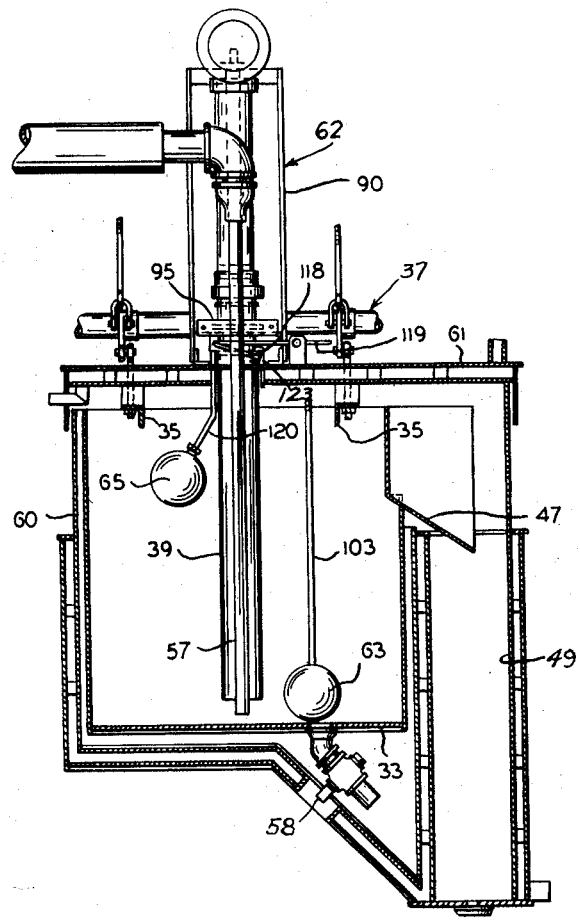
Figure 4 is a sectional view taken through the weigh bucket and its container, substantially along line IV—IV of Figure 3.
Figure 5:
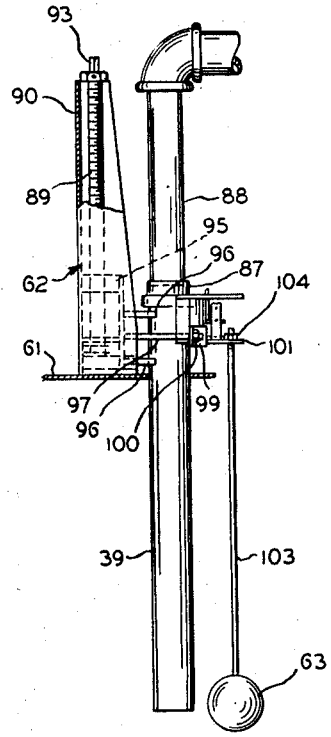
Figure 5 is a fragmentary detail view taken substantially along line V—V of Figure 3, and illustrating the adjusting means for the suction pipe and one of the float controls, for controlling and initiating a filling cycle of the weigh bucket.

The weigh bucket 33 is carried in an outer casing 60 which is shown as being jacketed to accommodate the circulation of steam around said weigh bucket and along the wall of the duct 49 (Figure 4). The casing 60 is suspended independently of the weigh bucket 33, suspended from the scale 36. Said casing has a cover 61 which also may be jacketed for the circulation of steam therethrough to maintain the asphalt in the weigh bucket hot and fluid.

The cover 61 forms a support for the suction pipe 39 on an adjusting mechanism 62 supported on said cover and extending upwardly therefrom and affording a means for adjusting the elevation of the suction pipe 39 with respect to the bottom of the weigh bucket, and thus determining the amount of asphalt that may be withdrawn from the weigh bucket, as will hereinafter more clearly appear as this specification proceeds.

The weigh bucket 33 has lower and upper floats 63 and 65 respectively therein for controlling the spraying of asphalt in the pugmill.

The upper float 65 serves to operate a suitable switch 117 on a pivoted switch arm 118 pivotally mounted on top of the cover 61, to effect operation of the valve 41 and the spray pump 43 when the weigh bucket is full, and to prevent the spraying of asphalt until the weigh bucket is full, as will hereinafter more clearly appear as this specification proceeds.

The lower float 63 serves to operate a suitable switch 115 on a switch arm 112, to close said switch when all of the asphalt has been pumped from the weigh bucket down to the bottom of the suction pipe 39 to hold the cycle timer for the system (not shown) from coming into operation to effect refilling of the weigh bucket until the required weight of asphalt has been sprayed in the pugmill, as will hereinafter more clearly appear as this specification proceeds.

The scale linkage and leverage arrangement 37 to effect weighing the weigh bucket 33 and the asphalt therein on the scale 36 is shown as including a plurality of eye-bolts 69 secured to each beam 35 on opposite sides of the weigh bucket and suspending said weigh bucket from spaced support beams 73, by links 75 in the form of eye-bolts connected with bellcranks 70 on torsion bars 76. The eye-bolts 69 are connected with the bellcranks 70 inwardly of the point of connection of the links 75 thereto through clevises 71. The torsion bars 76 are operatively connected with the scale 36 through lever arms 79 connected with a lever 77 through a suspension link 80. The lever 77 is suspended from the beam 73 through an eye-bolt and link indicated generally by reference character 81. A linkage 84 is provided to connect the lever 77 with a dial 83 of the scale 36 through the usual balancing capacity and tare bars indicated generally by reference character 85.

The adjustable suction pipe 39 has a packing gland 87 at its upper end, sealing said suction pipe to a pipe 88 and mounted for slidable movement along the pipe 88. The adjustable suction pipe 39 is adjustably moved along the pipe 88 by the adjusting mechanism 62, herein shown as comprising a screw 89 rotatably carried adjacent its ends in a vertically extending support standard 90 secured to the top of the cover 61 and extending upwardly therefrom. The upper end of the screw 89 is squared as indicated by the reference character 93 to accomoodate a crank or hand wheel to be detachably placed thereon to rotate said screw.

A carriage 95 threaded on the screw 89 is slidably guided between the side walls of the standard 90 and is vertically moved therealong upon turning of said screw. The carriage 95 has supporting connection with the suction pipe 39 by a means of spaced saddles 96 extending from said carriage and engaging the inner side of said suction pipe, and spaced bolts 97 extending along opposite sides of the pipe 39 and secured to a clamping member 99 by means of nuts 100, threaded on the outer ends of said bolts.

The low level float 63 is carried on the lower end of a vertical rod 103 slidably extending through a plate 101 extending outwardly from the clamping member 99. Lock nuts 104 are threaded on the upper end of the rod 103 and abut the top surface of the plate 101 when the float is in its lowermost position (see Figure 6). The nuts 104 engageable with the plate 101 also effect movement of the float 63 with the suction pipe 39. An arm 106 extends inwardly from the lower nut 104 along the top surface of the plate 101 and extends between two spaced vertical rods 107 connected between the plate 101, and a vertically spaced parallel plate 109.

The plate 109 has two spaced depending arms 111, between which is pivoted the switch arm 112 on a pivot pin 113. The switch arm 112 has the switch 115 mounted thereon (see Fgure 7). The switch 115 may be a mercury switch and serves to complete a cycle timer power circuit (not shown) when the float 63 is in its lowermost position. This will effect closing of the valve 41 supplying hot asphalt to the spray pump 43 and then effect opening of the valve 56 to a position to conduct hot asphalt through the pipe 57 to fill the weigh bucket 33.

The low level float 63 moving the rod 103 upwardly, as the weigh hopper 33 is filled with asphalt, will operate the switch arm 112 and mercury switch 115 to open said switch and maintain said switch open until the float 63 drops to its lowermost position. When the float 63 is in its lowermost position, the mercury switch 115 will close and complete the previously mentioned cycle timer power circuit, which may effect closing of the spray pump valve 41. The float 63 thus serves to hold the cycle timer power circuit open until the level of asphalt in the weigh bucket 33 drops below the bottom of the suction pipe 39.

The upper float 65 serves to operate the mercury switch 117 on the switch arm 118. The float 65 is connected with the switch arm 118 through a rod 120 slidably extending through the cover 61, and having said switch arm pivotally carried on the upper end thereof on a transverse pivot pin 121. The opposite end of the switch arm 118 is slidably guided on an upright support 123. Movement of the switch arm and rod 120 is controlled by a lever arm 119 pivoted to a rock shaft 119a (Figure 3).

Figure 2:
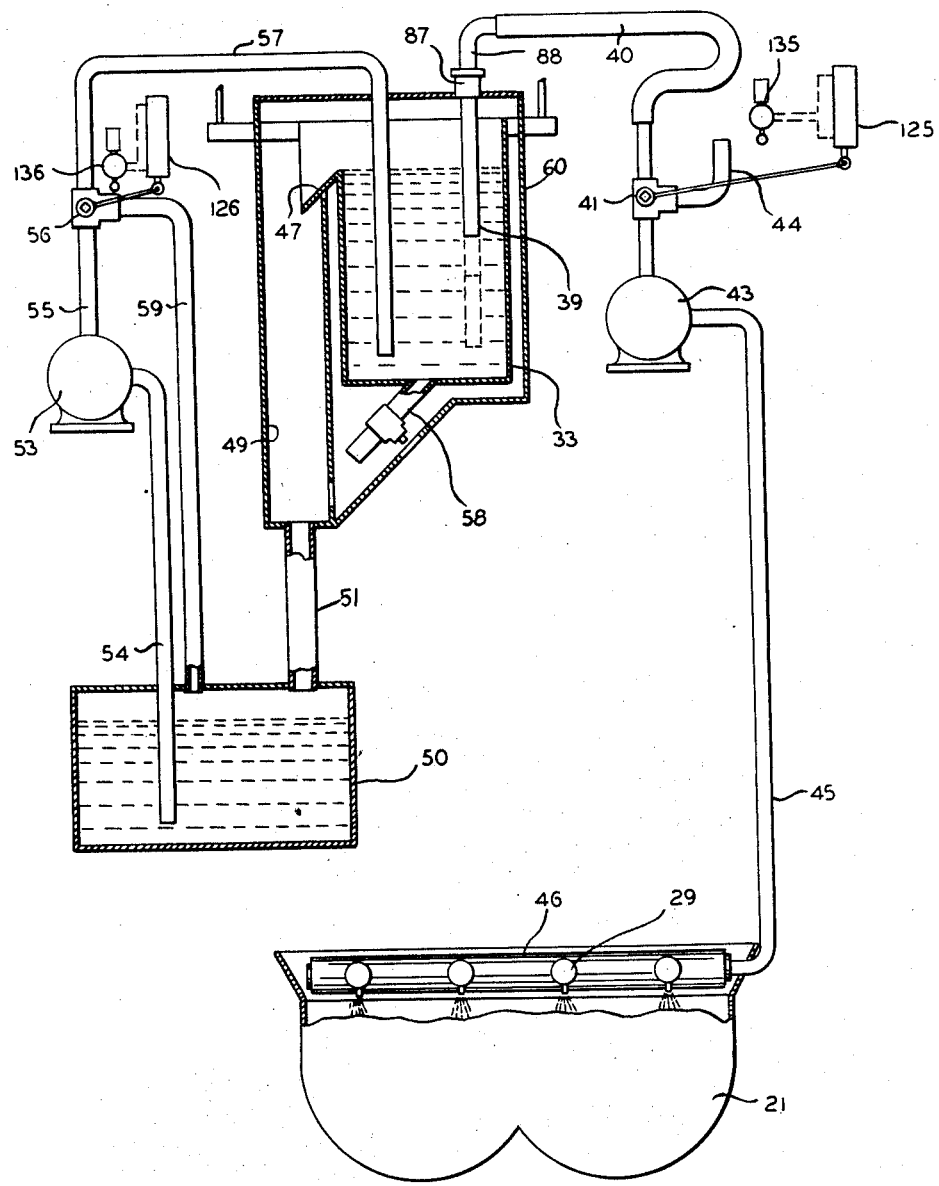
Figure 2 is a schematic drawing illustrating the asphalt circulating system and the means for filling the weigh bucket and withdrawing a predetermined volume of asphalt from the weigh bucket for spraying in the pugmill.

The valves 56 and 41 may be operated automatically under a control of a cyclic timer or may be operated under manual control when it is desired to initially measure asphalt to be supplied to the pugmill for mixture with the aggregate therein. In Figure 2 we have diagrammatically illustrated a hydraulic ram 125 for operating the valve 41 and another hydraulic ram 126 for operating the valve 56. The hydraulic rams may be double acting to move the respective valve into one position upon the admission of fluid under pressure to one end thereof and into another position upon the admission of fluid under pressure to the opposite end thereof. The supply and admission of fluid under pressure to the respective hydraulic rams 125 or 126 may be through suitable valve means, which may be solenoid operated and manually operated as desired.

As herein shown, a solenoid operated and manually controlled valve 135 is provided to control the supply and release of fluid under pressure to the hydraulic ram 125, while a solenoid and manually operated valve 136 is provided to control the supply and release of hydraulic fluid under pressure to opposite ends of the hydraulic ram 126.

In initially setting up the system for automatically measuring a batch of asphalt of a predetermined weight for mixture with aggregate in the pugmill 27, the suction pipe 39 may be raised to its uppermost position by operation of the screw 89, as previously described. The valve 136 may then be operated, preferably manually to operate the valve 56 to supply hot asphalt to the weigh bucket 33 and fill the weigh bucket to overflow over the overflow duct 47.

The valve 135 may then be operated to open the valve 41 to effect the pumping of asphalt into the pugmill by operation of the spray pump 43. During the syraying operation the suction pipe 39 may gradually be lowered into the weigh bucket until the correct weight of asphalt has been pumped to the pugmill as indicated by the scale 36. The scale 36 reads the weight of asphalt withdrawn from the weigh bucket 33 as asphalt is withdrawn from the weigh bucket and is of a type commonly known as a reverse reading scale. Lowering of the suction pipe 39 may then be stopped. The suction pipe 39 will then be set to deliver the same amount of asphalt for mixture with each succeeding batch of aggregate.

The system may then be automatically operated under the control of the cycle timer (not shown), the floats 63 and 65 and the mercury switches 115 and 117, operated by the respective floats. The cycle timer and electrical control circuit as well as the hydraulic control circuit form no part of the present invention so need not herein be shown or described further.

During automatic charging of the pugmill, the circulation pump may first fill the weigh bucket to the overflow by operation of the valve 56, the excess asphalt overflowing the top thereof along the overflow duct 47. The valve 56 will then be operated under control of the float 65 to circulate asphalt back to the storage tank 50, while the valve 41 may be operated to effect the spraying of asphalt in the pugmill through the spray bars 29. The spraying operation will continue until the level of the asphalt in the weigh bucket 33 reaches the level of the bottom of the suction pipe 39, at which time the valve 41 will be turned off and after a time delay governed by operation of the rest of the plant, the cyclic control circuit energized by the float 63 will effect the turning on of the valve 56 to initiate a next succeeding filling operation of the weigh bucket 33.

It may thus be seen that when the correct amount of asphalt has once been withdrawn from the weigh bucket 33, as determined by weighing on the scale 36, and the suction pipe 39 has been adjusted to the level of the top surface of the asphalt remaining in the weigh bucket, that a predetermined weight of asphalt will be delivered to the pugmill for mixture with the aggregate therein, and that the weight of the asphalt may readily be varied when it is desired to change the proportion of the mixture of the asphalt with the aggregate.

While we have herein shown and described one form in which our invention may be embodied, we wish it to be understood that we do not wish to be limited to the specific form shown, but that various modificatons and variations in the invention may be effected without departing from the spirit and scope of the novel concepts thereof.

We claim as our invention:

1. In a system for measuring fluid material such as asphalt and the like, a weigh bucket, scale means for supporting said weigh bucket and weighing the fluid material therein, an overflow from said weigh bucket, a source of supply of fluid material including a pump and a valve on the discharge side thereof, a second pump for withdrawing fluid material from said weigh bucket, a shut-off valve on the suction side of said second pump and a suction pipe on the upstream side of said second valve and extending within said weigh bucket, means adjustably moving said suction pipe with respect to the bottom of said weigh bucket and limiting the fluid material withdrawn from said weigh bucket as determined by the position of the suction end of said suction pipe with respect to the bottom of said weigh bucket, a float operated switch floating on the fluid material in said weigh bucket for discontinuing the filling thereof upon overflow of the asphalt therefrom and for initiating the operation of emptying said weigh bucket, and a second float operated switch for assuring the continuation of the emptying of said weigh bucket until the level thereof reaches the level of the bottom of said suction tube.

2. A measuring device for asphalt and the like comprising a weigh bucket having an overflow duct, scale means for supporting said weigh bucket and weighing and indicating the asphalt withdrawn from said weigh bucket, a supply pipe extending within said weigh bucket for filling the same, a pump and valve means controlling the supply of asphalt to said bucket through said supply pipe, a suction pipe extending within said weigh bucket for withdrawing asphalt therefrom, a valve and pump for withdrawing asphalt from said weigh bucket through said suction pipe, an upper float in said weigh bucket for operating said first mentioned valve means to discontinue filling of said bucket at a predeterminel level of asphalt therein, and a lower float in said weigh bucket for maintaining said second mentioned valve in position to withdraw asphalt from said weigh bucket to a predetermined level therein, and for initiating a circuit to effect operation of said first mentioned valve means to fill said weigh bucket at the beginning of a next succeeding weighing operation.

3. In an apparatus for measuring fluid material such as asphalt and the like, a weigh bucket having an overflow, scale means supporting said weigh bucket and weighing the asphalt therein, a source of supply of asphalt, a pump for withdrawing asphalt from said source of supply, a valve and a supply pipe connected with said pump and valve for supplying asphalt to said weigh bucket, a by-pass line connected from said valve to the source of supply of asphalt, a float in said weigh bucket and effecting operation of said valve to return asphalt to said source of supply through said by-pass line when the level of asphalt in said weigh bucket is such as to overflow along said overflow, a second float in said weigh bucket at a lower level than said first float, a suction pipe extending within said weigh bucket for withdrawing asphalt therefrom, a second valve controlling the withdrawal of asphalt from said weigh bucket, means manually operable to adjust the level of said suction pipe and said second float in accordance with a predetermined weight of asphalt to be withdrawn from said weigh bucket, and said second float holding said second valve open to assure the withdrawal of asphalt to the bottom of said suction pipe, and initiating a cycle to operate said first valve to initiate a next succeeding filling operation.

4. In an apparatus for measuring fluid material such as asphalt and the like, a weigh bucket having an overflow, scale means supporting said weigh bucket and weighing the asphalt withdrawn therefrom, a source of supply of asphalt, a pump for withdrawing asphalt from said source of supply, a valve and a supply pipe connected with said pump and valve for supplying asphalt to said weigh bucket, a by-pass line connected from said valve to the source of supply of asphalt, a float in said weigh bucket and effecting operation of said valve to return asphalt to said source of supply through said by-pass line when the level of asphalt in said weigh bucket reaches said overflow, a second float in said weigh bucket at a lower level than said first float, a suction pipe extending within said weigh bucket for withdrawing asphalt therefrom, means manually operable to adjust the level of said suction pipe and said second float in accordance with a predetermined weight of asphalt to be withdrawn from said weigh bucket, a valve connected with said suction pipe downstream of said weigh bucket, a pump connected with said valve on the downstream thereof for withdrawing asphalt through said suction pipe, said first float effecting the operation of said first valve to by-pass asphalt back to said source of supply and effecting operation of said second valve to withdraw asphalt from said weigh bucket, and said second float maintaining said second mentioned valve open to effect the withdrawal of asphalt to the bottom of said suction pipe.

5. A method of measuring fluid materials, comprising the steps of introducing fluid material into a weigh bucket to overflow the weigh bucket and stopping the introduction of the fluid material upon the overflow thereof, withdrawing the fluid material from the weigh bucket by suction and during the withdrawing operation weighing the fluid material as withdrawn, continuing the withdrawing operation until a given weight of fluid material has been withdrawn, then stopping the weighing operation and establishing a suction level in the weigh bucket to which a given weight of fluid material may be withdrawn, and thereafter filling the weigh bucket to overflow and withdrawing only to the level of fluid material established at the termination of the first weighing operation for a succession of weighing operations.

6. An apparatus for measuring fluid materials such as asphalt and the like comprising a weigh bucket having an overflow, scale means for supporting said weigh bucket and designating the weight of fluid material withdrawn from the weigh bucket and thereby determining a level in said weigh bucket to which a given weight of material may be withdrawn from said weigh bucket, a pump having communication with said weigh bucket for supplying asphalt thereto to overflow along said overflow, a second pump for withdrawing asphalt from said weigh bucket to a level determined by said scale means, said second pump having a suction pipe extending within said weigh bucket and adjustable to the level determined by said scale means, to accommodate the successive withdrawal of given weights of asphalt from said weigh bucket solely by volume.

7. An apparatus for measuring fluids such as asphalt and the like comprising a weigh bucket having an overflow duct, a cover for said weigh bucket, scale means supporting said weigh bucket and weighing the asphalt therein and indicating the weight of asphalt withdrawn from said weigh bucket, a supply pipe and pump for filling said weigh bucket to overflow along said overflow, a suction pipe extending within said weigh bucket from the top thereof for withdrawing asphalt therefrom, and adjustable support means mounted on said cover and having supporting engagement with said suction pipe for adjusting the level of the suction end of said suction pipe to withdraw a preselected weight of asphalt from said weigh bucket to a level of asphalt remaining in said weigh bucket at the termination of the operation of withdrawing a given weight of asphalt from said weigh bucket as indicated by said scale means.

8. An apparatus for measuring fluids such as asphalt and the like comprising a weigh bucket having an overflow duct, scale means supporting said weigh bucket for weighing the asphalt therein and indicating the weight of asphalt withdrawn from said weigh bucket, a supply pipe and pump for filling said weigh bucket to overflow along said overflow, a suction pipe extending within said weigh bucket from the top thereof for withdrawing asphalt therefrom, and adjustable support means for said suction pipe for adjusting the level of the suction end of said suction pipe to withdraw a preselected weight of asphalt from said weigh bucket comprising a standard extending upwardly from said weigh bucket, a carriage vertically movable along said standard and having supporting engagement with said suction pipe, and manually operable means for moving said carriage vertically along said standard.

9. An apparatus for measuring fluids such as asphalt and the like comprising a weigh bucket having an overflow duct, scale means supporting said weigh bucket and weighing the asphalt therein and indicating the weight of asphalt withdrawn from said weigh bucket, a supply pipe and pump for filling said weigh bucket to overflow along said overflow, a suction pipe extending within said weigh bucket for withdrawing asphalt therefrom, adjustable support means for said suction pipe for adjusting the level of the suction end of said suction pipe to withdraw a preselected weight of asphalt from said weigh bucket comprising a standard extending upwardly from said weigh bucket, a carriage vertically movable along said standard and having supporting engagement with said suction pipe, and manually operable means for moving said carriage vertically along said standard comprising a rotatable screw on said standard, manually rotatable to adjust the level of said suction pipe at will.

10. An apparatus for measuring fluid material such as asphalt and the like comprising a weigh bucket having an overflow, scale means supporting said weigh bucket and weighing the asphalt therein and indicating the weight of asphalt withdrawn from said weigh bucket during the withdrawal of asphalt from said weigh bucket, a suction pipe extending within said weigh bucket, means manually operable to adjust the level of the suction end of said suction pipe to withdraw asphalt from the top of said weigh bucket to a predetermined level determined by the level of asphalt remaining in said weigh bucket at the termination of the withdrawal of a preselected weight of asphalt from said weigh bucket as indicated by said scale means, a supply pipe extending within said weigh bucket for supplying asphalt thereto, upper and lower floats in said weigh bucket, the upper float stopping the filling operation of said weigh bucket through said supply pipe upon the flow of asphalt over said overflow and initiating the withdrawing operation through said suction pipe, and the lower float being adjustably movable with said suction pipe and maintaining the operation of withdrawing asphalt from said weigh bucket to the level of the suction end of said suction pipe.

11. A method of measuring fluid material comprising the steps of first filling a weigh bucket to overflow the top thereof, stopping the filling operation upon overflow of the material from the top of the weigh bucket, withdrawing fluid material from the weigh bucket by suction and during withdrawal of the fluid material weighing the fluid material withdrawn and thereby establishing a depth to which a given weight of material may be withdrawn from the weigh bucket, discontinuing the withdrawing operation upon the withdrawal of a given weight of fluid material from the weigh bucket and thereby determining a level in the weigh bucket to which a given weight of material may be withdrawn from the weigh bucket for a next succeeding series of measuring operations, and during the next succeeding measuring operations first filling the weigh bucket to overflowing, and then withdrawing to the level established for a given weight of fluid material to be withdrawn from the weigh bucket.

References Cited in the file of this patent

UNITED STATES PATENTS

| | | |
|---|---|---|
| 1,536,589 | Keen | May 5, 1925 |
| 1,646,817 | Gordon | Oct. 25, 1927 |
| 2,273,180 | De Castro | Feb. 17, 1942 |
| 2,702,684 | MacLeod et al. | Feb. 22, 1955 |